United States Patent
Epli (10) Patent No.: US 10,213,723 B2
(45) Date of Patent: Feb. 26, 2019

(54) FILTER ELEMENT HAVING A FILTER BELLOWS

(71) Applicant: Mann+Hummel GMBH, Ludwigsburg (DE)

(72) Inventor: Sven Epli, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/160,621

(22) Filed: May 20, 2016

(65) Prior Publication Data

US 2016/0263514 A1    Sep. 15, 2016

Related U.S. Application Data

(63) Continuation of application No. PCT/EP2014/072243, filed on Oct. 16, 2014.

(30) Foreign Application Priority Data

Nov. 20, 2013    (DE) .................. 10 2013 019 330

(51) Int. Cl.
   *B01D 46/00* (2006.01)
   *B01D 46/52* (2006.01)
   (Continued)

(52) U.S. Cl.
   CPC ........... *B01D 46/522* (2013.01); *B01D 46/10* (2013.01); *B01D 46/2411* (2013.01);
   (Continued)

(58) Field of Classification Search
   CPC . B01D 46/10; B01D 46/522; B01D 2275/206
   (Continued)

(56) References Cited

U.S. PATENT DOCUMENTS

| 6,312,489 B1 * | 11/2001 | Ernst ................ B01D 46/0005 55/385.3 |
| 2005/0144916 A1 * | 7/2005 | Adamek ............... B01D 29/21 55/484 |

(Continued)

FOREIGN PATENT DOCUMENTS

| DE | 2137309 A1 | 2/1973 |
| DE | 3622955 A1 | 1/1988 |

(Continued)

*Primary Examiner* — Robert A Hopkins
(74) *Attorney, Agent, or Firm* — James Hasselbeck (57) ABSTRACT

A filter element for fluids, including: a filter bellows made of a filter medium, the filter medium placed in the filter bellows along pleated edges in a zig-zag shape, in pleats that extend between opposite end edges of the filter bellows; wherein an end pleat having a pleated edge and an opposite free end margin is arranged on each opposite end face of the filter bellows, pleated edges that are consecutive along an end edge of a pleat end at opposite surfaces of the filter bellows; wherein a segment of one of the end edges extends obliquely to one of the pleated edges in such a manner that, in the one segment, the pleated edges on a first one of the opposite surfaces have a different length than the pleated edges of an opposite one of the opposite surfaces; and wherein the pleats are laterally sealed by the end edges.

12 Claims, 7 Drawing Sheets

(51) Int. Cl.
  *B01D 46/10* (2006.01)
  *B01D 46/24* (2006.01)
(52) U.S. Cl.
  CPC .... *B01D 46/2414* (2013.01); *B01D 2201/122* (2013.01); *B01D 2275/206* (2013.01)
(58) Field of Classification Search
  USPC .......................................... 55/495, 497, 521
  See application file for complete search history.

(56) References Cited

U.S. PATENT DOCUMENTS

| | | | |
|---|---|---|---|
| 2006/0254230 A1* | 11/2006 | Powell | B01D 46/10 55/521 |
| 2011/0136895 A1 | 6/2011 | Gregory et al. | |
| 2013/0111859 A1 | 5/2013 | Bryant | |

FOREIGN PATENT DOCUMENTS

| | | |
|---|---|---|
| DE | 19709309 A1 | 9/1998 |
| DE | 19816431 A1 | 10/1998 |
| DE | 19735992 A1 | 2/1999 |
| DE | 20310833 U1 | 11/2004 |
| DE | 102008028834 A1 | 12/2009 |
| DE | 102011083657 * | 3/2011 |
| DE | 102010053200 A1 | 6/2012 |
| DE | 102011083657 A1 | 3/2013 |
| EP | 0645170 A1 | 3/1995 |
| EP | 0975413 A1 | 2/2000 |
| FR | 2973258 A1 | 10/2012 |

* cited by examiner

FILTER ELEMENT HAVING A FILTER BELLOWS

TECHNICAL FIELD

The invention relates to a filter element and a filter system for filtering a fluid with a filter bellows, in particular, for use as a flat air filter of an internal combustion engine.

BACKGROUND OF THE INVENTION

The end pleats within the meaning of the invention are the two outer pleats on opposite end faces of the filter bellows. The end margins are the two free margins of the filter medium, which run along the end pleats and delimit same at the end faces of the filter bellows. The end edges of the filter bellows are the two other free margins of the filter bellows, which extend between the end margins and run so as to correspond to the pleating of the filter bellows. The pleated edges are the edges along which the filter medium is pleated. With commercially available, substantially cuboid filter bellows that are folded in a zigzag shape, the end margins and the pleated edges are generally straight and run parallel to one another. The end edges run in a zigzag shape and perpendicular to the end margins and to the pleated edges, when the filter bellows is viewed from the side. Before the filter medium is pleated, the end edges of the filter bellows—which later has a substantially cuboid imaginary envelope—run straight and parallel to one another. The imaginary envelope is stretched by the end edges, the pleated edges or end margins adjacent to a post-filtration side of the filter bellows, and the pleated edges or end margins adjacent to a pre-filtration side.

With filter bellows of flat filter elements, the filter media are not closed, i.e., the end pleats are not connected to one another, nor are the end edges. In contrast, with filter bellows of round filter elements, the filter media are closed, i.e., the end pleats thereof are connected to one another. Filter bellows of flat filter elements may be planar, but may also have bends in different directions.

SUMMARY OF THE INVENTION

The invention addresses the problem of creating a filter element for filtering a fluid that allows for considerable flexibility of design. Another problem addressed by the invention is the creation of a filter system having a corresponding filter element.

The aforementioned problems are solved by: a filter element with which at least one segment of one of the end edges thereof runs obliquely to at least one of the pleated edges so that in this segment the pleated edges on one surface have a different length than the pleated edges on the other surface, wherein the pleats are laterally sealed by the end edges; and by a filter system having such a filter element.

Favorable designs and advantages of the invention arise from the other claims, the description, and the drawings.

The invention proposes to a filter element for fluids, in particular of an internal combustion engine, in particular of a motor vehicle, including a filter bellows made of a filter medium, the filter medium being placed in the filter bellows along pleated edges, in particular in a zig-zag shape, in pleats that extend respectively between opposite end edges of the filter bellows (12); wherein an end pleat having a pleated edge and an opposite free end margin is arranged on each opposite end face of the filter bellows, and at least two pleated edges that are consecutive along an end edge of a pleat end at opposite surfaces of the filter bellows; wherein at least one segment of one of the end edges extends obliquely to at least one of the pleated edges in such a manner that, in said segment, the pleated edges on the one surface have a different length than the pleated edges of the other surface; and wherein the pleats are laterally sealed at the end edges, each by means of at least one sealing agent line, in particular, a support glue bead.

Chamfering an end edge surface—at least in some regions—on the element and/or linearly lagging the end edge surface in space produces a clearly defined orientation of the filter bellows in the filter housing. This is ensured by the filter bellows itself, and not by applying an additional geometry, such as, for example, foaming, additional plastic parts, or the like. This eliminates confusion of the direction of flow and the fiber orientation in production, caused by accidental turning of the filter bellows. An orientation of the filter bellows can be very advantageous, for example, with air filters that work together with an air mass meter. Such sensors react very sensitively to the nature of the flow of the fluid, so that a defined and reproducible installation position of the filter bellows is very advantageous.

An end edge surface is, respectively, that surface in which the end edges of the pleats end.

In the filter element, it may be advantageous to realize pleating shapes having end edge segments and pleated edges that run along circle segments, ellipse segments, or polygons. In this manner, it is possible to further improve the freedom of shape of the filter bellows, and thus of the filter element, in particular, a flat filter element. The filter bellows and the flat filter element may thus be optimally adapted to different filter housings.

Instead of a substantially cuboid envelope, the filter bellows may also have a different shape of envelope—in particular, polyhedral, preferably substantially prismatic, and (truncated) wedge-shaped—or a type of ellipsoid envelope. It may thus be provided that the filter bellows tapers or widens in the direction of flow of the fluid through the filter bellows, depending on the direction of flow. The pleats of the filter bellows may advantageously have a trapezoid shape. Advantageously, the filter bellows may be designed so as to be symmetrical with respect to the end edges.

Pleating shapes may be advantageously realized, which have end edge segments and pleated edges that run along circle segments, ellipse segments, or polygons. In this manner, it is possible to further improve the freedom of shape of the filter bellows, and, in particular, for a flat filter element. The filter bellows and the flat filter element may thus be optimally adapted to different filter housings.

In a preferred example, the oblique segment forms substantially an entire end edge surface.

According to an advantageous embodiment, the end edges may additionally run obliquely to that direction in which the pleated edges follow one another.

According to an advantageous embodiment, the pleats may be laterally sealed at the end edges, each by means of at least one trace of sealant, in particular, a support glue bead. The trace of sealant at the end edges results in an especially flexible design of the lateral sealing of the pleats of the pleated bellows, which would be practically unachievable with a conventional sideband sealing. Preferably, at least one of the traces of sealant of the end edge follows in the at least one oblique segment of the end edge. In particular, the trace(s) of sealant run(s) at a largely constant distance from the respectively associated end edge, preferably along the entire pleated bellows. In particular, in the oblique segment or oblique segments of the end edges, there arises a correspondingly oblique-running lateral sealing, by means of a trace of sealant.

Advantageously, a circumferential seal, in particular, a seal—preferably made of polyurethane foam—that has been foamed onto the filter bellows may be provided circumferentially on the pleated bellows.

According to an advantageous embodiment, the at least one segment of at least one of the end edges may additionally extend obliquely to that direction in which the pleated edges follow one another. This creates a free space in the volume of the pleated bellows, thus enabling a clearly defined installation position for the filter bellows, wherein the free space may advantageously be provided for a filter housing component.

According to another advantageous embodiment, a circumferential seal, in particular, a seal—preferably made of polyurethane foam—that has been foamed onto the filter bellows may be provided circumferentially on the pleated bellows. This makes it possible to achieve considerable options in the design of the shape of the filter element.

According to another advantageous embodiment, there may be provided at least one first element segment and one second element segment, which each have end edge segments running parallel to one another on opposite end faces, wherein one element segment has end edges running perpendicular to the pleated edges and the other element segment has at least one beveled end edge surface. Advantageously, the element segment including the beveled end edge may have shorter pleated edges than the other element segment. In this manner, flat filter elements can be designed with a flexible layout, and can be inserted in a defined manner, without confusion, into a filter housing.

According to another advantageous embodiment, one or more segments of the end edges that run obliquely to at least one of the pleated edges may have an outer shape having at least one change of direction. In particular, a wave-shaped margin may be formed. There is great freedom of design, which may depend on the available installation space for the finished filter element, or on the finished filter system in which the filter element is being used.

According to another advantageous embodiment, a housing component of a filter housing may protrude out into the space created by the at least one obliquely running segment of the end edge in the installed state as intended, so as to produce a clearly defined installation space with a flat filter element. The possibility of defined installation of the filter element into a filter housing makes it possible to avoid confusion of the post-filtration side and pre-filtration side of the filter bellows. This is especially advantageous when the filter medium has a non-homogeneous internal structure, such as a filter characteristic that is variable in the direction of flow, a depth-variable chemical coverage of the filter medium, and much more.

According to another advantageous embodiment, the filter bellows may be assembled into a circular element. In particular, the circular element may be configured so as to be cylindrical at one axial end, and have an end plate, in particular, a closed end plate, which extends substantially perpendicular to the longitudinal axis of the circular element and is beveled at least in some regions at the opposite axial end. At the end of the circular element that is beveled at least in some regions, a circumferential seal may be provided, in particular, a seal—preferably made of polyurethane foam— that has been foamed onto the filter bellows, wherein the seal has an opening through which the interior of the circular element is accessible. The result is a space-conserving filter element and a filter system having a filter element that can be installed at a point of use in a manner adapted to the installation space.

Advantageously, a seal may be provided at, and in particular, foamed onto, the end of the circular element that is beveled at least in some regions. The end that is beveled at least in some regions may be completely covered with the seal at the surface thereof, or it may be that only a part, such as an annular area, is covered with the seal. The uncovered area of this end edge may be sealed with a trace of sealant, in particular, a glue bead.

According to another aspect of the invention, a filter system having a filter housing is provided, in which a replaceable filter element according to the invention for fluids, in particular, of an internal combustion engine, in particular, of a vehicle, is arranged. In particular, the filter housing may have a structure that is complementary to the beveled end edge segment, and that permits confusion-free installation of the filter element into the filter housing.

The filter system including the filter element according to the invention enables an advantageous use of the available installation space when the filter space is being installed, this being scarce in the motor vehicle sector. This succeeds in increasing the capacity of the filter element with an equally complicated installation space.

It is particularly advantageous to use the filter element as an air filter, in particular, as a flat air filter or circular filter for an internal combustion engine. Also conceivable is use for other flowing media, such as oil, fuel, urine, or the like.

According to another aspect, the invention relates to the use of the filter element as a flat air filter for an internal combustion engine.

BRIEF DESCRIPTION OF THE DRAWINGS

Further advantages shall be made apparent by the following description of the drawings. The drawings depict embodiments of the invention. The drawings, the description, and the claims encompass numerous features in combination. A person skilled in the art shall also expediently consider the features individually, and rationally combine said features into other combinations.

DESCRIPTION OF THE INVENTION

In the drawings, identical or similar components are labeled with identical reference signs. The drawings only illustrate examples, and are not to be understood to be limiting.

Figure 1:
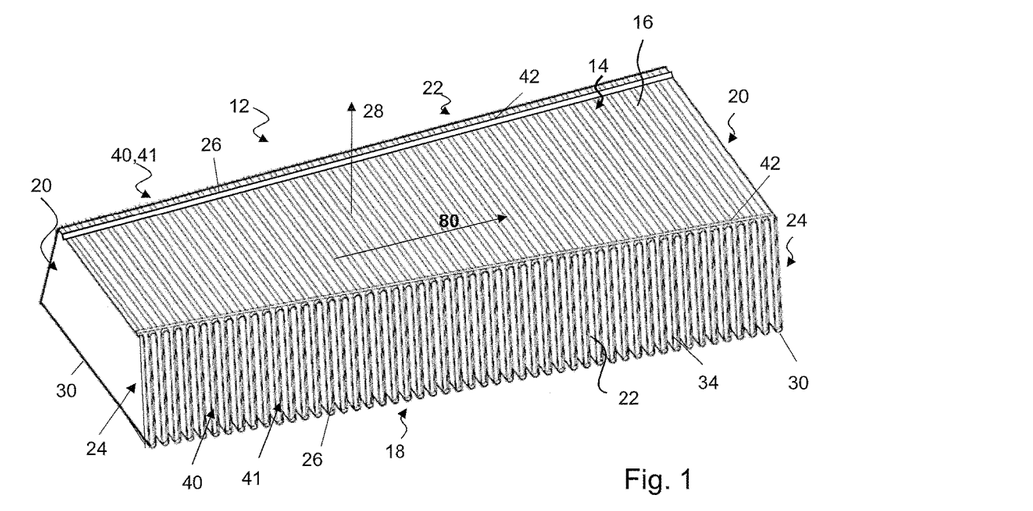
FIG. 1 illustrates an isometric representation of a first embodiment of a filter bellows of a flat filter element of an air filter of an internal combustion engine of a vehicle, wherein the filter bellows is pleated in a zigzag shape from a filter medium, and has a trapezoidal basal surface, as well as an approximately conical profile in the transverse direction.

FIG. 1 illustrates a filter bellows 12 according to a first embodiment, for a flat filter element (not shown elsewhere) of an air filter of an internal combustion engine of a vehicle. The flat filter element has a trapezoidal basal surface. The flat filter element can be installed into a filter housing of the air filter, in order to filter combustion air of the internal combustion engine. The corresponding flat filter element can be easily replaced when necessary, for example, when a load limit is reached.

The filter bellows 12 is formed from a filter medium 14 that has been pleated into a zigzag shape. The filter bellows 12 has two surfaces 16, 18 forming a post-filtration side (above in FIG. 1) and a pre-filtration side (below in FIG. 1), based on a provided direction of flow 28. The filter bellows 12 further includes two end faces 20 (in the foreground and background, respectively, in FIG. 1), as well as two end edges 22 (on the left and on the right in FIG. 1). The end edges 22 end at an end edge surface 41 on each of the sides of the filter bellows 12.

The filter bellows 12 is open at the end pleats 24 and end edges 22 thereof, i.e., neither the end pleats 24 nor the end edges 22 are connected to one another. The end pleats 24 are the outer pleats at the end faces 20 of the filter bellows 12. The end pleats run parallel to the pleated edges 26, along which the filter medium 14 is pleated, wherein the pleated edges 26 follow one another in a direction 80 between the front and rear end faces 20. The pleated edges 26 run perpendicular to the direction 80. Pleated edges 26 of consecutive pleats 34 end respectively alternating in the first and second surfaces 16, 18. The end edges 22 each have the zigzag profile of the pleating, when viewed from the side.

The direction of flow of the air to be filtered through the filter element 10 from the pre-filtration side (which here is the lower surface 18) to the post-filtration side (which here is the upper surface 16) is indicated in FIG. 1 by an arrow 28. Two end margins 30 of the end pleats 24 are located on the lower surface 18. In FIG. 1, the two end margins 30 are visible in the foreground. The filter medium 14, having a plurality of embossing bridges (not shown) that extend perpendicular to the pleated edges 26, may be provided respectively between adjacent pleated edges 26 of a pleat 34 or an end pleat 24. The embossing bridges serve to stabilize the pleats 34 or the end pleats 24. The filter medium 14 may be sharply bent or gently curved along the pleated edges 26.

In the embodiment depicted, by way of example, the pleated edges 26 on the upper surface 16 are shorter than the pleated edges 26 respectively adjacent thereto on the lower surface 18, i.e., the end edges 22 of both end edge surfaces 41 run obliquely to the pleated edges 26. The two end edge surfaces 41 run obliquely to the pleated edges 26 as a whole. In addition, the end edges 22 or end edge surfaces 41 also run obliquely to the direction 80 in this example.

In the unpleated state, corresponding long pleated edges 26 and short pleated edges 26 alternate one after the other through the oblique profile of the end edge surfaces 41 relative to the pleated edges 26. Before the filter medium 14, the end edges 22 run in a zigzag shape. The end edges 22 each meet obliquely at the pleated edges 26. Each of the points of the zigzag profile coincides with one of the pleated edges 26. The filter bellows 12 widens approximately conically into the lower surface 18, in a transverse direction in which the pleated edges 26 extend, towards the direction of flow 28. An imaginary envelope of the filter bellows 12 that has been stretched by the end edges 22, the adjacent pleated edges 26 on an upper surface 16 of the filter bellows 12, and the adjacent pleated edges 26 or end margins 30 on the lower surface 18, has overall approximately the shape of a truncated wedge. In the embodiment depicted, the filter bellows 12 also broadens along the direction 80 from the front end face 20 at the front in drawing to the end face 20 at the rear, such that the basal surface thereof is a trapezoid.

In addition to the end edges 22, a support glue bead 42 also runs on the upper surface 16 of the filter bellows 12. The support glue beads 42 are applied onto the filter medium 14 either before or after the introduction of perforations or cut edges, as well as before or after the preparation of the pleats 34 of the filter bellows 12. After the pleats 34 and end pleats 24 have been prepared, and once the support glue beads 42 have been applied, the hardened support glue beads 42 each connect adjacent pleats 34 and thus stabilize the filter bellows 12. The support glue beads 42 applied prior to the preparation of the pleats also serve to laterally seal off the pleats 34.

Figure 2:
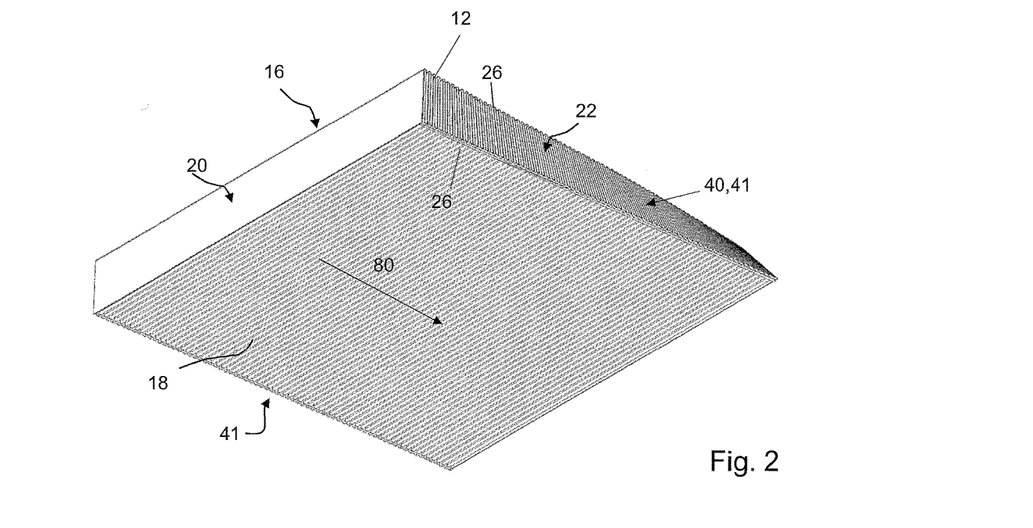
FIG. 2 illustrates an isometric representation of a filter bellows, with a view to the underside thereof, according to an embodiment of the invention having a rectangular layout and a filter bellows that has been pleated into a zigzag shape and has an obliquely running end surface at one end edge surface having a linear lag of the pleats of the filter bellows in space.
Figure 3:
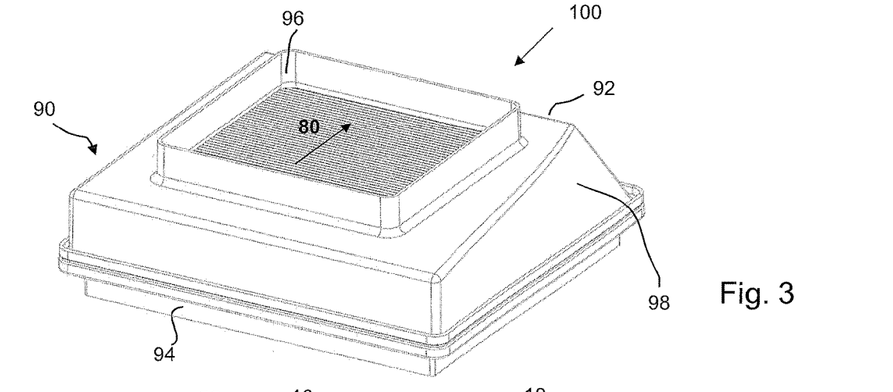
FIG. 3 illustrates an isometric representation of a filter system having a filter housing in which the filter element of FIG. 2 has been inserted.
Figure 4:
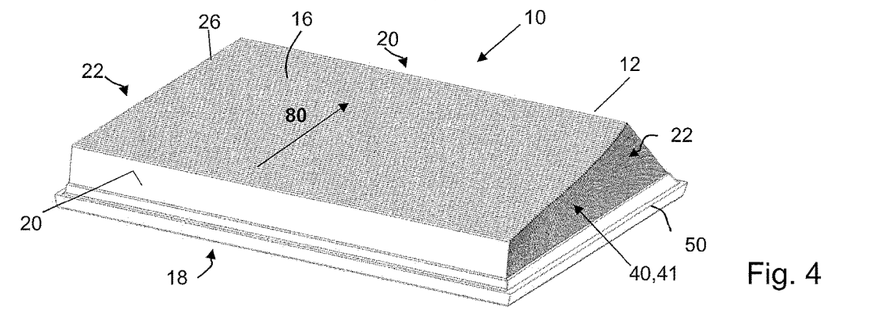
FIG. 4 illustrates an isometric representation of a filter element of the filter bellows of FIG. 3, with a circumferentially foamed seal.
Figure 5:
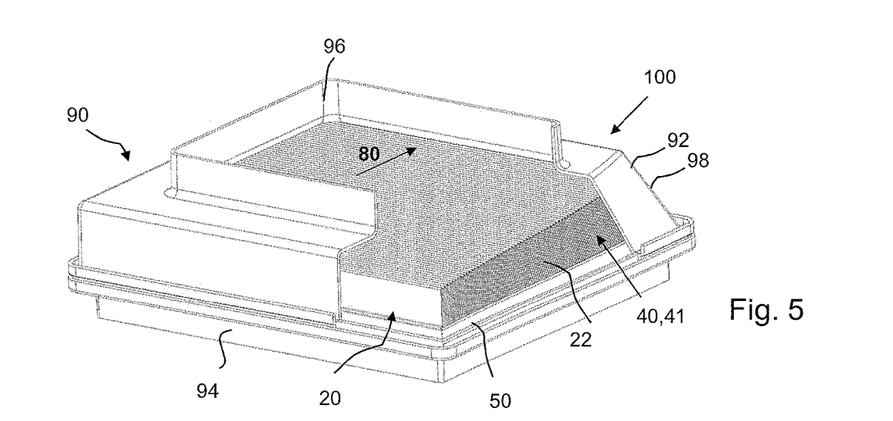
FIG. 5 illustrates an isometric representation of a filter system of FIG. 3, with a partially cut-open filter housing with the filter bellows of FIG. 2.

FIGS. 2, 3, 4, and 5 illustrate an embodiment of a filter element 10 according to the invention, having a rectangular cross-section. FIG. 2 illustrates an isometric view of an underside of the filer bellows 12 for a filter element. FIG. 3 illustrates an isometric view of a filter system 100 having a filter element 10 including the filter bellows 12 of FIG. 2 arranged in a filter housing 90. FIG. 4 illustrates the filter element 10 including the filter bellows 12 of FIG. 2. FIG. 5 illustrates an isometric representation of the filter system 100 of FIG. 3, with a partially cut-open filter housing 90.

The filter element 10 includes a filter bellows 12 pleated in a zigzag shape, which has a rectangular basal surface on which the filter bellows is framed by a circumferential, foamed seal 50. The seal 50 is preferably a foamed seal, in particular, a polyurethane seal. The filter bellows 12 is otherwise—inclusive of the basal surface thereof and the arrangement of the beveled segments—constructed analogously to the filter bellows 12 of the example in FIG. 1, and, in particular, sealed off at the end edges 22 with a trace of sealant.

The filter housing 90 includes a first housing shell 92 (above in FIGS. 3 and 5) and a second housing shell 94 (below in FIGS. 3 and 4). The housing shells 92, 94 lie each with a collar on the seal 50, and may be connected to one another, such as by means of screws, clips, or the like. Arranged in the upper housing shell 92 is an opening 96 that releases an outflow surface or inflow surface of the filter element 10, depending on the intended direction of flow. Such an opening—or even a tube connection—may also be provided in the lower housing shell 94. The filter element 10 including the circumferential seal 50 thereof separates the post-filtration side from the pre-filtration side of the filter housing 90.

Between the end faces 20, pleated edges 26 follow one another in the direction 80; transversely thereto, end edges 22 that end in end edge surfaces 41 are configured. The filter bellows 12 protrudes out from the circumferential seal 50, and has, at one of the end edges 22 (to the right in FIG. 2) thereof, an obliquely running end surface 40, which is additionally provided with a linear lag: the inclination of the end edge 22 increases in the direction 80 going out from one edge of the end face 20 (to the front in FIG. 4). Thus, the length of the oblique end surface 40, as measured from the upper surface 16 to the lower surface 18, increases from one side of the filter bellows 12 to the other in the direction 80.

In this example, the beveled end surface 40 runs along the whole side of the end edge surface 41, from one end face 20 to the other, and also obliquely to the pleated edges 26 and obliquely to the direction 80.

Such a structure may be advantageous, for example, for a confusion-free installation of the filter element into the filter housing 90. The housing 90 has a corresponding shape for this purpose. Thus, the side surface 98 of the upper housing part 92 is shaped so as to correspond in complementarity to the beveled end surface 40, so that the side surface 98 runs substantially parallel to the obliquely running end surface 40 of the filter element 10.

Figure 6:
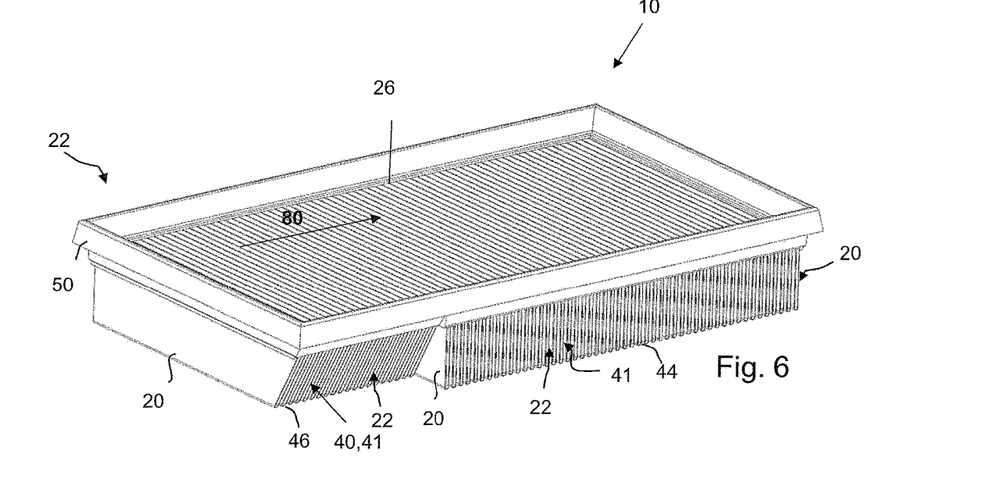
FIG. 6 illustrates an isometric representation of another embodiment of a filter element having a rectangular layout, having a beveled end edge in a segment of the filter bellows.
Figure 7:
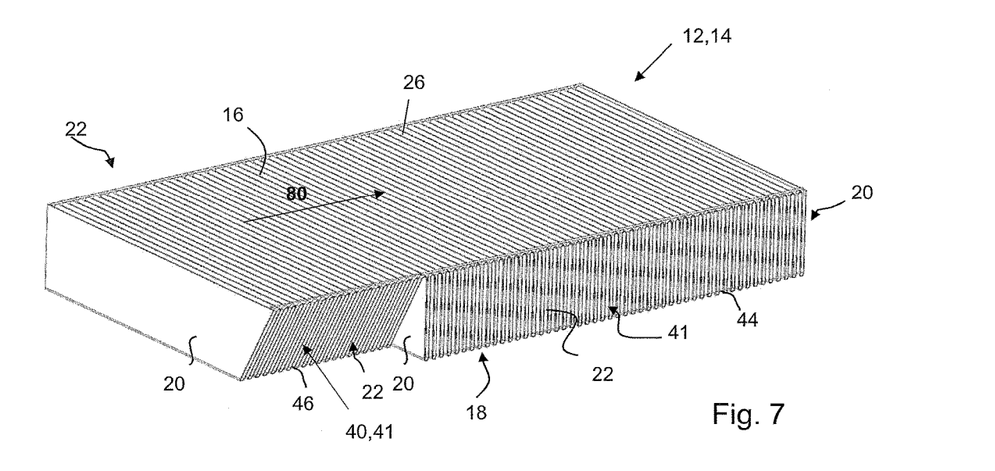
FIG. 7 illustrates an isometric representation of the filter bellows of the filter element of FIG. 6.

FIGS. 6 and 7 illustrate another embodiment of a filter element 10 according to the invention. FIG. 6 illustrates an isometric representation of another embodiment of a filter element 10 having a rectangular layout and a beveled end edge 40 arranged on an element segment 46; FIG. 7 illustrates an isometric representation of the filter bellows 12 of the filter element 10 of FIG. 6.

The filter bellows 12 is otherwise—inclusive of the basal surface thereof and the arrangement of the beveled segments—constructed analogously to the filter bellows 12 of the example in FIG. 1.

A second element segment 46 adjoins the first element segment 44. The first element segment 44 has end edges 22 running perpendicular to the pleated edges 26, so that perpendicular end edge surfaces 41 that are parallel to one another are configured, whereas the second element segment 46 has a beveled end edge 22 (the front end edge 22 in FIG. 4), and has substantially shorter pleated edges 26 than the first element segment 44. Such a beveled end edge surface 41 on the filter element 10 results in a clearly defined orientation of the filter bellows 12 in a filter housing. In addition, there is free space available for other components, so that available installation space can be better used when the filter element 10 or filter system including the filter element 10 is being installed.

In this example, the end edge surface 41 in the element segment 46 runs parallel to the direction 80.

Figure 8:
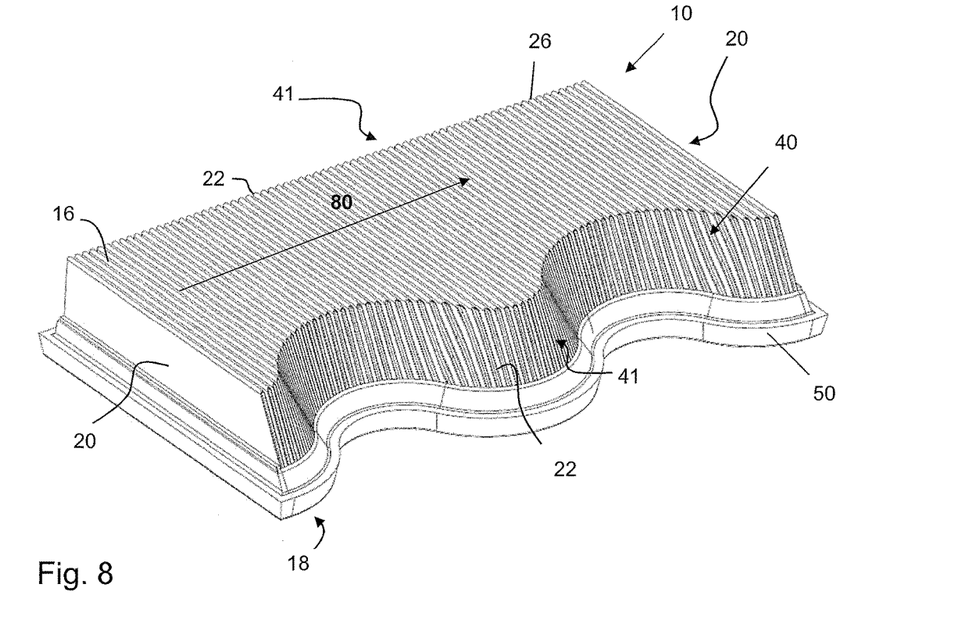
FIG. 8 illustrates an isometric representation of another embodiment of a filter element having a substantially rectangular layout, but with a wave-shaped beveled end edge surface.
Figure 9:
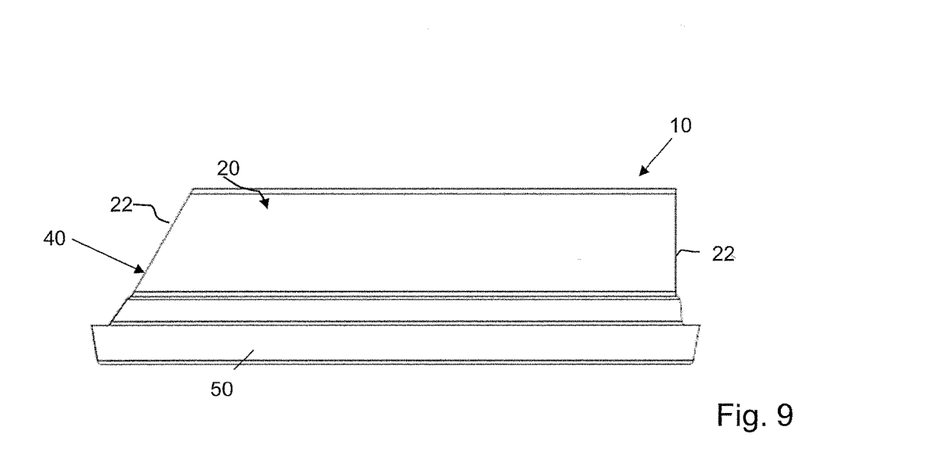
FIG. 9 illustrates a side view of the filter element of FIG. 8.

FIGS. 8 and 9 illustrate another embodiment of the filter element 10. FIG. 8 illustrates an isometric representation, and FIG. 9 illustrates a side view of the filter element 10.

The filter element 10 has a substantially rectangular layout, but with a wave-shaped beveled end edge surface 41, wherein a plurality of changes of direction of the course of the end edge 40 relative to the pleated edges 26 take place along the direction 80. The opposite end edge surface 41 runs straight and is not beveled.

The filter bellows 12 is otherwise—inclusive of the basal surface thereof and the arrangement of the beveled segments—constructed analogously to the filter bellows 12 of the example in FIG. 1. The recesses in the oblique end edge 40 enable a confusion-free installation of the filter bellows 12 into a filter housing. In addition, the wave-shaped course of the front oblique end surface 40 produces free spaces in the layout of the filter element 10 that can be used in turn for mounting that is optimized for the installation space. The circumferential seal 50 and the lateral sealing off of the open end edges 22 with a trace of sealant (trace of sealant 42 in FIG. 1) enables a very free design of the cross-section of the filter bellows 12.

Figures 10, 11:
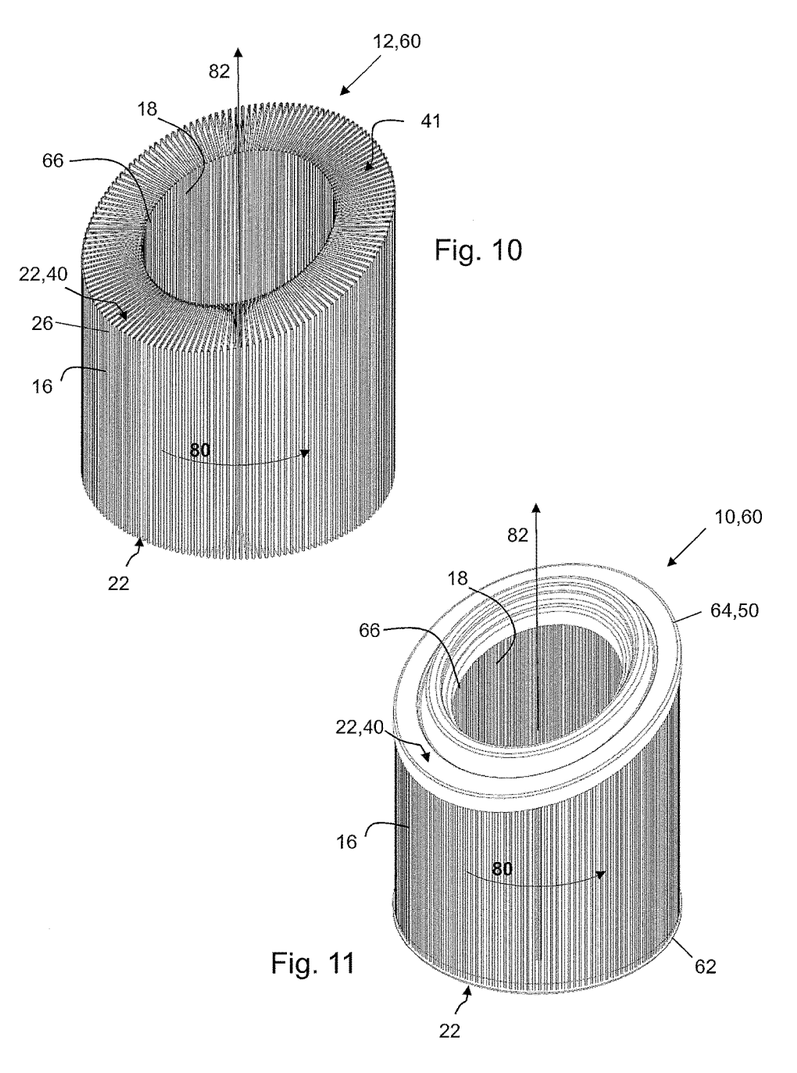
FIG. 10 illustrates an isometric representation of a filter bellows for a filter element according to another embodiment of the invention, with which the filter bellows is assembled into a circular element and is beveled at one end.
FIG. 11 illustrates an isometric representation of a filter element having the filter bellows of FIG. 10 that has been assembled into the circular element, and that has a horizontal end plate at one end and is beveled at the opposite end, and is sealed at the beveled end with a circumferential, annular seal.

FIGS. 10 and 11 illustrate another embodiment of a filter element 10, wherein FIG. 10 illustrates an isometric representation of a filter bellows 12 and FIG. 11 illustrates an iso-metric representation of the filter element 10 including the filter bellows 12. The filter bellows 12 is assembled into a circular element 60 with a longitudinal axis 82, and is otherwise—inclusive of the basal surface thereof and the arrangement of the beveled segments—constructed analogously to the filter bellows 60 of the example in FIG. 1. Optionally, a separate sealing off of the end edges 22 with a trace of sealant can be omitted if both end plates or corresponding seals, in particular, foamed polyurethane seals are provided.

The circular element 60 is beveled at one end of the filter bellows 12, so that the free end of the circular body 60 is arranged obliquely to the longitudinal axis 82 of the filter bellows 12. The pleated edges 26 now follow one another in the direction 80 along the circumference of the circular element 60. The surfaces 16 and 18 in which the pleated edges 26 end form the outside and inside of the circular element 60.

The end edge surfaces 41 including the open end edges 22 are each arranged at the free ends of the circular element 60. The circular element 60 is closed at one axial end with an end plate 62, which is arranged horizontally, i.e., perpendicular to the longitudinal axis 82 of the circular element 60. The circular element 60 is cylindrical in shape at this end. At the opposite end, the circular element 60 is beveled and provided with an end plate 64, in particular, a seal—preferably made of polyurethane foam—that has been foamed onto the filter bellows 12, the end plate including an opening 66 that can form an inflow channel or outflow channel.

The trace of sealant (42 in FIG. 1), which is not recognizable, at the end edges 22 serves to stabilize the filter bellows 12 upon insertion into the tool for foaming the end plates 62, 64 on.

The beveled shape of the filter element 10 permits on the one hand a reproducible mounting of the filter element 10 in a filter housing of a filter system, which is especially beneficial with replaceable filter elements 10, as well, as well as better use of available installation space.

Figure 12:
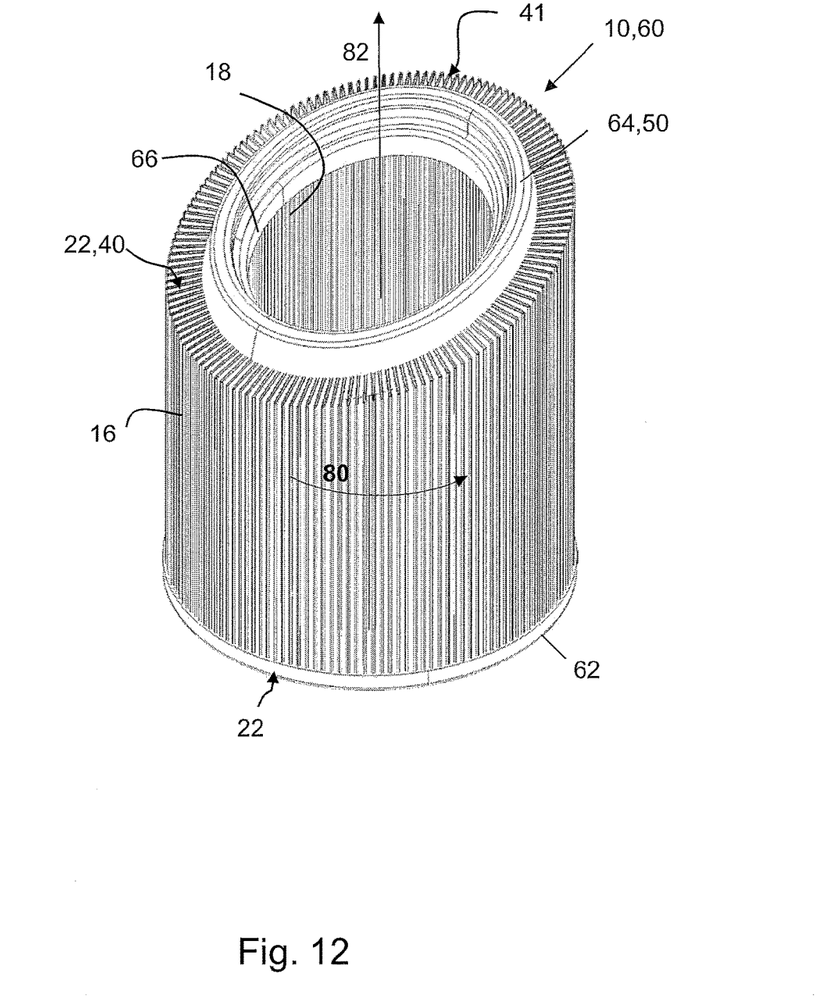
FIG. 12 illustrates an isometric representation of the filter element having the filter bellows of FIG. 10 that has been assembled into the circular element, and that has a horizontal end plate at one end and is beveled at the opposite end, and is partially covered with an annular seal, wherein exposed regions of the beveled end edge surface are sealed off with a trace of sealant in the filter bellows.

FIG. 12 illustrates another embodiment of a filter element 10, as an isometric representation of a filter element 10 including a filter bellows 12. The filter bellows 12 is assembled into a circular element 60 with a longitudinal axis 82, and is otherwise—inclusive of the basal surface thereof and the arrangement of the beveled segments—constructed analogously to the filter bellows 12 of the example in FIG. 10.

The circular element 60 is beveled at one end of the filter bellows 12, so that the free end of the circular body 60 is arranged obliquely to the longitudinal axis 82 of the filter bellows 12. The pleated edges 26 follow one another in the direction 80 along the circumference of the circular element 60.

At the beveled end of the filter bellows 12 of the filter element 10, a seal ring 50, in particular, a foamed seal ring—preferably made of polyurethane foam—extends only over a part of the upper oblique end surface 40, for example, close to the radially inner circumference. The part of the end surface 40 that is not covered by the seal ring 50 is sealed off with a trace of sealant (42 in FIG. 1), in particular, glue beads.

Figures 13, 14:
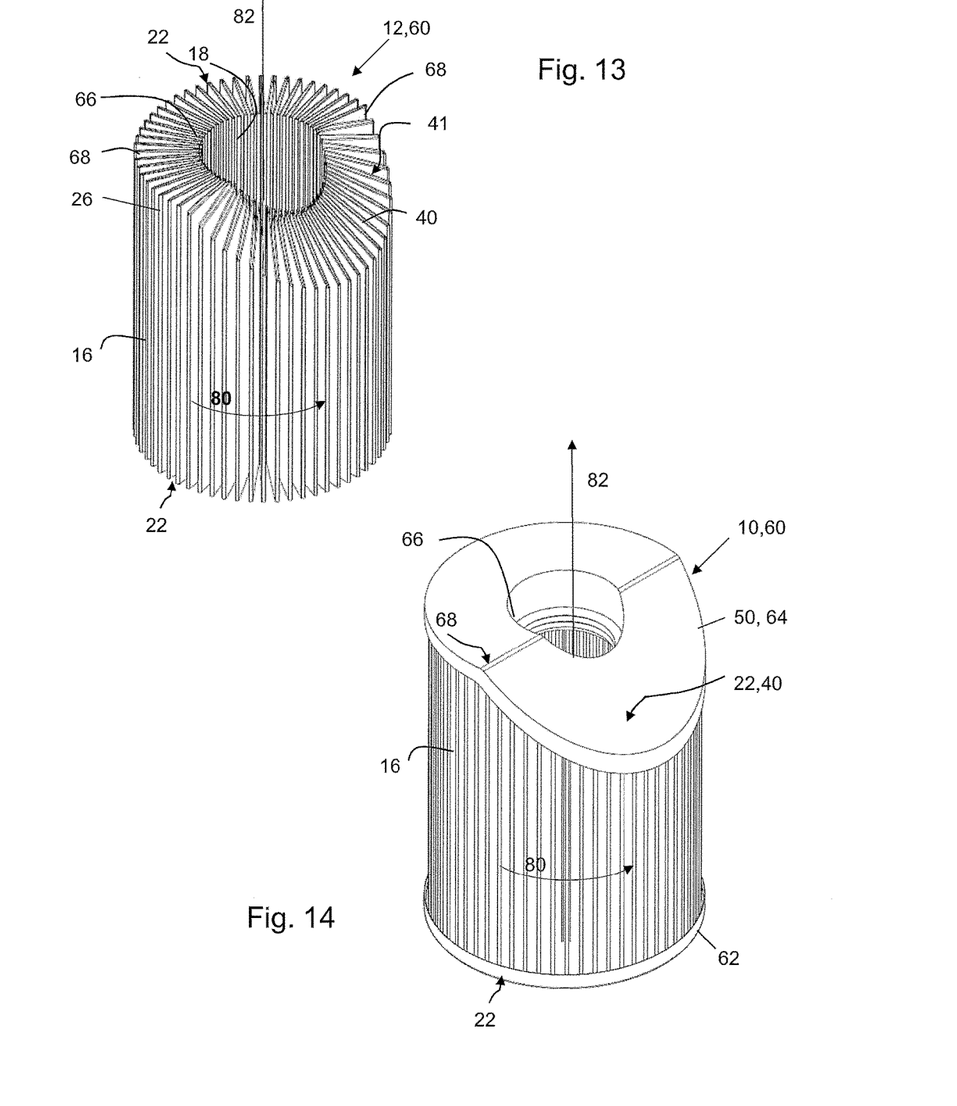
FIG. 13 illustrates an isometric representation of a filter bellows for a filter element according to another embodiment of the invention, with which the filter bellows is assembled into a circular element and has at one end a non-beveled region of the end edge surface thereof and a beveled region of the end edge surface thereof.
FIG. 14 illustrates an isometric representation of the filter element having the filter bellows of FIG. 13 that has been assembled into the circular element, and that has a horizontal end plate at one end and is sealed off with an annular seal at the opposite end.

FIGS. 13 and 14 illustrate another embodiment of a filter element 10, wherein FIG. 13 illustrates an isometric representation of a filter bellows 12 and FIG. 14 illustrates an isometric representation of the filter element 10 including the filter bellows 12. The filter bellows 12 is assembled into a circular element 60 with a longitudinal axis 82, and is otherwise—inclusive of the basal surface thereof and the arrangement of the beveled segments—constructed analogously to the filter bellows 12 of the example in FIG. 1. Optionally, a separate sealing off of the end edges 22 with a trace of sealant can be omitted if both end plates 62, 64 are provided.

The circular element 60 is half-beveled at one end of the filter bellows 12, so that the free end of the circular body 60 runs horizontally, i.e., perpendicularly to the longitudinal axis 82 on one half of the filter bellows 12 up to a boundary line 68, and is arranged obliquely to the longitudinal axis 82 of the filter bellows 12 on the other half, going away from the boundary line 68. Pleated edges 26 follow one another in the direction 80 along the circumference of the circular element 60.

The end edge surfaces 41 including the open end edges 22 are each arranged at the free ends of the circular element 60. The circular element 60 is closed at one axial end with an end plate 62, which is arranged horizontally, i.e., perpendicular to the longitudinal axis 82 of the circular element 60. The circular element 60 is cylindrical in shape at this end. At the opposite end, the circular element 60 is beveled and provided with an end plate 64, in particular, a seal—preferably made of polyurethane foam—that has been foamed onto the filter bellows 12, the end plate including an opening 66 that can form an inflow channel or outflow channel.

The half-beveled shape of the filter element 10 permits on the one hand a reproducible mounting of the filter element 10 in a filter housing of a filter system, which is especially beneficial with replaceable filter elements 10, as well, as well as better use of available installation space.

What is claimed is:

1. A filter element for fluids, comprising:
   a filter bellows made of a sheet of filter medium, the filter medium sheet folded in into zig-zag pleats, each pleat having:
      a first pleat fold edge arranged on a prefiltration surface of the filter bellows; and
      an opposite second pleat fold edge arranged on an opposite post filtration surface of the filter bellows;
   each pleat having:
      a first pleat end edge extending from the first pleat fold edge on the prefiltration surface, to the opposite second pleat fold edge arranged on the post filtration surface;
      a second pleat end edge extending from the first pleat fold edge on the prefiltration surface, to the opposite second pleat fold edge arranged on the post filtration surface, the first and second pleat end edges arranged at opposites ends of the pleat fold edges of the pleat;
   wherein the first pleat end edges of the pleats form a first end surface extending from the prefiltration surface to the opposite post filtration surface of the filter bellows on the first pleat end edges;
   wherein the second pleat end edges of the pleats form an opposing second end surface of the filter bellows, extending from the prefiltration surface to the opposite post filtration surface of the filter bellows on the second pleat end edges;
   wherein a first group of side-by-side pleats have the first pleat end edges extending obliquely to the first fold edge or to the second fold edge such that, the first group of side-by-side pleats have the first pleat end edge on the first end surface of the filter bellows that has a different length relative to a length of the second pleat end edge on the second end surface of the filter bellows;
   wherein the pleat end edges of adjacent pleats are directly sealed onto each other by at least one trace of a sealant in the form of a support glue bead between the pleat end edges of adjacent pleats;
   wherein the first group of side-by-side pleats at the first end surface of the filter bellows has first pleat end edges running oblique to the second pleat end edges of the first group of side-by-side pleats such that the first end surface twists or deflects along it length from end to end, such that the prefiltation surface at the second portion of pleats has a different pleat fold edge length than a pleat fold edge length of same respective pleats at the post filtration surface of the filter bellows.

2. The filter element according to claim 1, wherein
   at least one segment of one of the end edges of the pleats runs obliquely to a direction in which the pleat fold edges follow one another.

3. The filter element according to claim 1, wherein
   a circumferential seal made of polyurethane foam, that has been foamed onto the filter bellows is provided circumferentially on the pleated bellows.

4. The filter element according to claim 1, wherein
   there are provided at least one first element segment; and
   at least one second element segment;
   wherein the at least one first element segment and the at least one second element segment each have end edge segments running parallel to one another on opposite end faces;

wherein the at least one first element segment has end edges running perpendicular to the pleated edges; and wherein the at least one second other element segment has at least one beveled end edge.

5. The filter element according to claim 4, wherein the second element segment having the beveled end edge has shorter pleated edges than the at least one first element segment.

6. The filter element according to claim 1, wherein one or more segments of the at least one segment of one of the end edges that run obliquely to at least one of the pleated edges have an outer shape having at least one change of direction.

7. The filter element according to claim 6, wherein the first end surface of the filter bellows has a wave-shaped margin.

8. The filter element according to claim 1, wherein a housing component of a filter housing protrudes out into an empty space created by the obliquely extending at least one segment of one of the end edges in an installed state of the filter element into the filter housing, so as to produce a clearly defined installation space with a flat filter element.

9. The filter element according to claim 1, wherein the filter bellows is assembled into a circular element.

10. The filter element according to claim 9, wherein the circular element is cylindrical in shape at one axial end, and has an end plate that extends substantially perpendicular to a longitudinal axis of the circular element, and wherein the circular element is beveled at an opposite axial end.

11. The filter element according to claim 10, wherein at the beveled axial end of the circular element, a circumferential seal is provided;

wherein the seal is comprised of polyurethane foam, that has been foamed onto the filter bellows;

wherein the seal has an opening through which the interior of the circular element is accessible.

12. A filter system comprising a filter element according to claim 1;

a filter housing in which the filter element is replaceably arranged.

* * * * *